(12) United States Patent
Gradu et al.

(10) Patent No.: US 7,207,574 B2
(45) Date of Patent: Apr. 24, 2007

(54) STABILIZER BAR WITH VARIABLE TORSIONAL STIFFNESS

(75) Inventors: Mircea Gradu, Wooster, OH (US); Timothy L. Schlernitzauer, Canton, OH (US)

(73) Assignee: The Timken Company, Canton, OH (US)

( * ) Notice: Subject to any disclaimer, the term of this patent is extended or adjusted under 35 U.S.C. 154(b) by 451 days.

(21) Appl. No.: 10/739,379

(22) Filed: Dec. 18, 2003

(65) Prior Publication Data

US 2004/0217569 A1 Nov. 4, 2004

Related U.S. Application Data

(63) Continuation-in-part of application No. 10/646,077, filed on Aug. 22, 2003, now abandoned.

(60) Provisional application No. 60/467,093, filed on May 1, 2003.

(51) Int. Cl.
*B60G 17/027* (2006.01)

(52) U.S. Cl. ................................ 280/5.511; 267/277

(58) Field of Classification Search ............ 280/5.511, 280/5.509, 5.51, 124.107, 124.137, 124.152, 280/124.166; 188/296, 307; 267/277, 191
See application file for complete search history.

(56) References Cited

U.S. PATENT DOCUMENTS 3,197,233 A * 7/1965 Klaus et al. ............. 280/5.502
5,791,444 A * 8/1998 Schiffler .................... 188/293

5,826,687 A 10/1998 Büngeler et al.
(Continued)

FOREIGN PATENT DOCUMENTS

DE 4443809 A1 4/1996
(Continued)

OTHER PUBLICATIONS

Brochure, DELPHI Energy & Chassis Systems, 2002, "Dynamic Body Control System".
Brochure, SAE International, Aleksander Hac, Mar. 2002, "Influence of Active Chassis Systems on Vehicle Propensity to Maneuver-Induced Rollovers".

*Primary Examiner*—David R. Dunn
(74) *Attorney, Agent, or Firm*—Polster, Lieder, Woodruff & Lucchesi, L.C.

(57) ABSTRACT

A stabilizer bar for controlling the roll of an automotive vehicle has left and right sections, each provided with a torsion rod and a torque arm. The torsion rods are aligned along a transverse axis and attached to a structural component of the vehicle, while the torque arms are connected to the left and right control arms of the vehicle's suspension system. In addition, the bar has a coupling between the torsion rods of the two sections for controlling the torsional stiffness of the bar. The coupling includes a rotor fitted to one of the torsion rods and a housing fitted to the other torsion rod, with the housing receiving the rotor, such that a cavities exist between the rotor and housing. Both the rotor and housing carry vanes, that alternate so that the vanes of the rotor are located between the vanes of the housing. The cavities contain a magneto-rheological fluid. The bar also includes an electrical coil controls the viscosity of the fluid either at the coupling or at a valve located remote from the coupling, but in either place, such that the variations in the viscosity of the fluid control the torsional stiffness of the stabilizer bar.

12 Claims, 5 Drawing Sheets

U.S. PATENT DOCUMENTS

| | | |
|---|---|---|
| 5,845,753 A | 12/1998 | Bansbach |
| 6,149,166 A * | 11/2000 | Struss et al. ............. 280/5.511 |
| 6,394,240 B1 * | 5/2002 | Barwick .................... 188/296 |
| 6,428,019 B1 | 8/2002 | Kincad et al. |
| 6,507,778 B2 | 1/2003 | Koh |
| 6,866,276 B2 * | 3/2005 | Williams et al. ...... 280/124.107 |

FOREIGN PATENT DOCUMENTS

| | | |
|---|---|---|
| EP | 0974477 A1 | 7/1999 |
| EP | 1321321 A2 | 12/2002 |
| GB | 2230237 A | 10/1990 |
| GB | 2275661 A | 2/1994 |

* cited by examiner

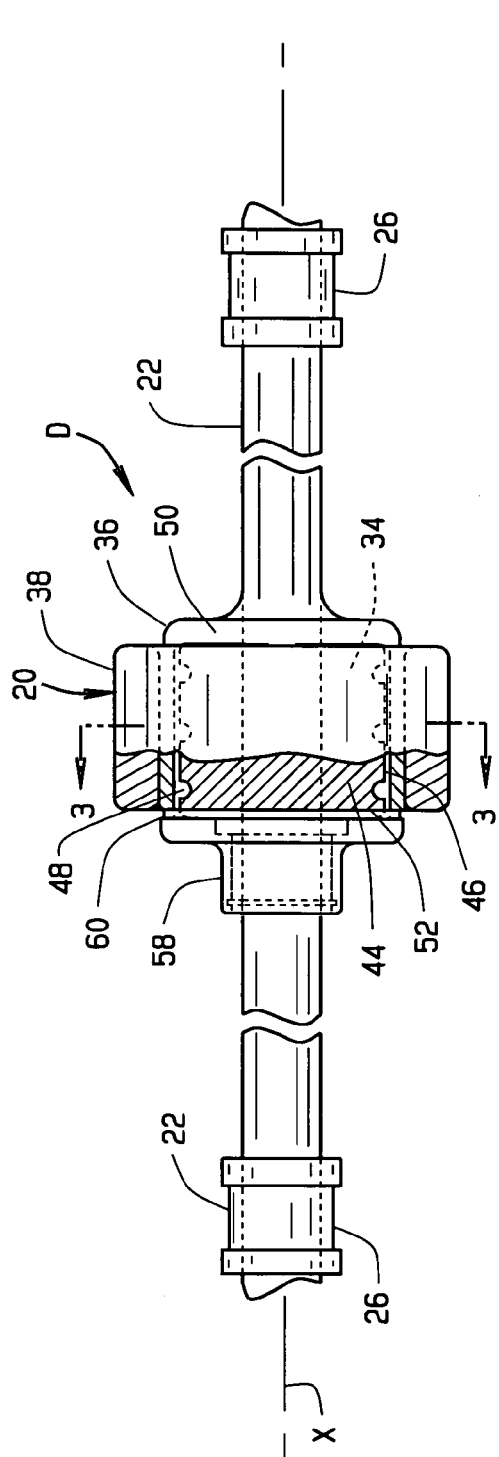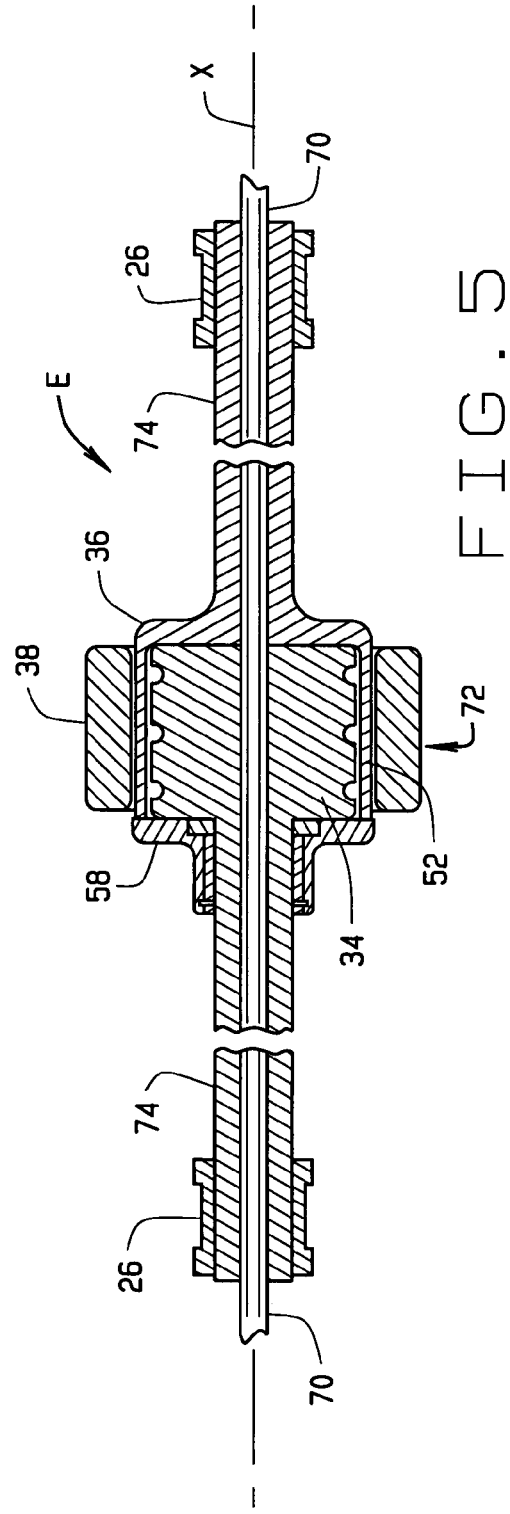

US 7,207,574 B2

STABILIZER BAR WITH VARIABLE TORSIONAL STIFFNESS

CROSS REFERENCE TO RELATED APPLICATIONS

This application is a continuation of U.S. application Ser. No. 10/646,077, filed Aug. 22, 2003 now abandoned, and derives priority from that application as well as from U.S. provisional application 60/467,093, filed May 1, 2003, for the invention of Mircea Gradu entitled "Active Roll Control System with Electronically Controlled Torsional Stiffness of the Stabilizer Bar"

STATEMENT REGARDING FEDERALLY SPONSORED RESEARCH OR DEVELOPMENT

Not Applicable

BACKGROUND OF THE INVENTION

This invention relates to suspension systems for automotive vehicles and more particularly to a stabilizer bar for a suspension system.

The typical passenger automobile has independently suspended front wheels, as do similar vehicles, such as sports utility vehicles, vans, and light trucks. In order to prevent excessive body roll in such a vehicle when it negotiates turns, particularly at higher speeds, the vehicle is equipped with a stabilizer bar that connects the two sides of its front suspension. The stabilizer bar constitutes nothing more than a torsion bar which extends transversely across the front of the vehicle where it is attached to the frame of the vehicle on each side of the frame, yet is free to rotate relative to the frame. At its ends, the stabilizer bar has torque arms which are attached to the control arms which carry the steering knuckles. As a consequence, the control arms tend to move in unison in the same direction and transfer forces to the frame—forces which modulate and retard roll.

While a stabilizer bar will improve the control and orientation of a vehicle when the vehicle negotiates a turn, particularly at high speeds and on a paved surfaces, it detracts from the ride when the vehicle travels along straight road surfaces. Moreover, it makes travel at low speeds, either straight or through turns, more uncomfortable than it could otherwise be. After all, when one wheel is deflected upwardly, such as by encountering a bump, the other wheel will attempt to lift as well, since the stabilizer bar connects the control arms for both wheels, and oppositely directed forces are applied to the vehicle frame. This can produce a rocking motion when the vehicle travels off road or over uneven road surfaces—a phenomenon sometimes referred to as "antiroll bar waddle". Hence, different driving conditions call for stabilizer bars with different torsional stiffness. At one extreme are the conditions encountered off road and on secondary roads traveled at relatively low speeds and also those encountered on paved roads in the absence of turns. These conditions require low torsional stiffness. At the other extreme are the conditions encountered when negotiating turns on paved surfaces at high speeds. These conditions require high stiffness. Most stabilizer bars have high stiffness to resist roll and maintain control in turns.

BRIEF DESCRIPTION OF THE SEVERAL VIEWS OF THE DRAWINGS

FIG. 2 is a longitudinal elevational view, partially broken away and in section, of the stabilizer bar;

FIG. 5 is a longitudinal sectional view of a modified stabilizer bar;

Corresponding reference characters indicate corresponding parts throughout the several views of the drawings.

DETAILED DESCRIPTION OF INVENTION

Figure 1:
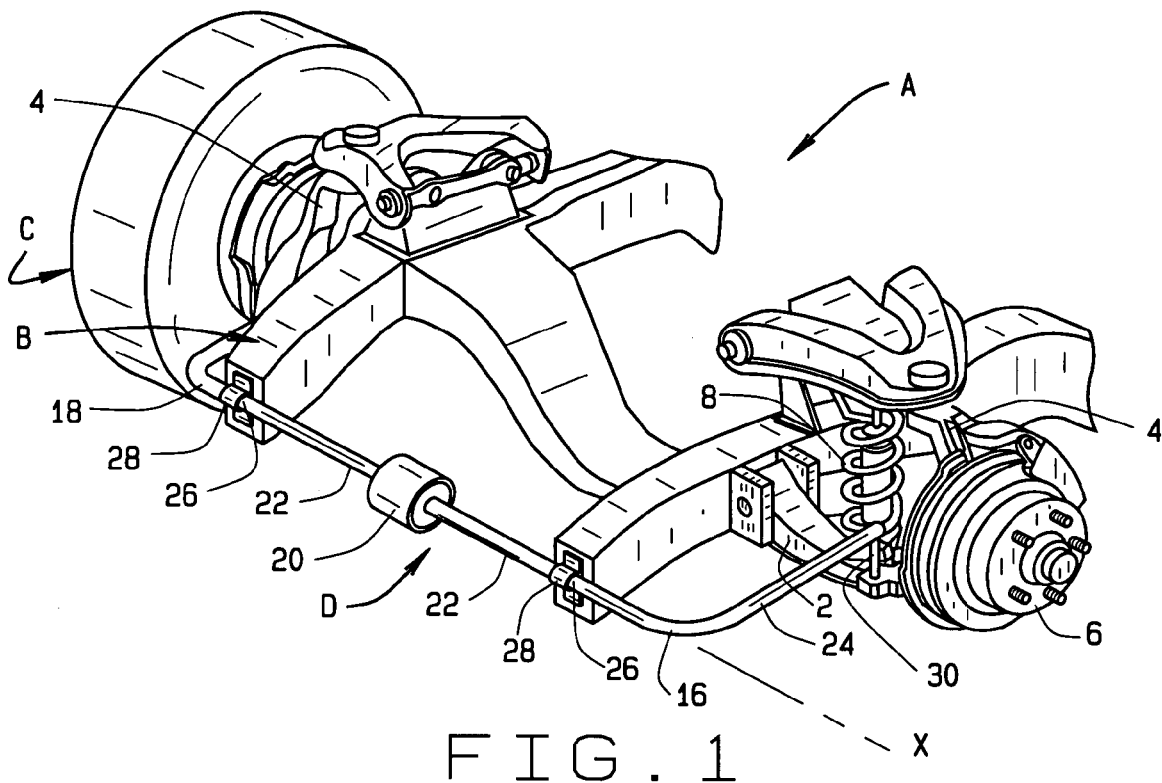
FIG. 1 is a perspective view of a suspension system provided with the stabilizer bar of the present invention.

Referring now to the drawings, an automotive vehicle has a suspension system A (FIG. 1) that is attached to a rigid structural component B, such as a frame or a unified body, of the vehicle. The suspension system A couples left and right road wheels C to the structural component B such that the road wheels can displace vertically with respect to the structural component B. The suspension system A includes a stabilizer bar D which is attached to both sides of the structural component B and, in effect connects the left and right wheels C. The arrangement is such that when the body of the vehicle rolls—and with it the structural member B—the stabilizer bar D, being extended between the two wheels C, resists the tendency to roll. But when one of the wheels C is displaced vertically, the bar D may transmit a force to the opposite wheel C and that force urges the opposite wheel C in the same direction as the displacement—at least when bar D possesses a measure of torsional stiffness. Actually, the torsional stiffness of the bar D can be varied to accommodate differing road and driving conditions.

Considering the suspension system A in more detail, it may be a double wishbone or McPherson strut suspension. Either one, on each side of the vehicle, includes (FIG. 1) control arm 2 that is attached to the structural component B such that it can pivot about an axis that extends generally longitudinally with respect to the vehicle. The control arm 2 extends laterally from that pivot axis, and at its outboard end is fitted with suspension upright 4, the two being coupled together such that they too can pivot relative to each other. When the suspension upright 4 steers the vehicle, it takes the form of a steering knuckle that is coupled to the control arm 2 through a universal pivot, such as a ball-and-socket joint. In any event, the suspension upright 4 supports a wheel end 6 to which the road wheel C is attached. The typical wheel end 6 has a housing that is attached to the upright 4, a hub to which the road wheel C is secured, and a bearing between the hub and housing to enable the hub and wheel C to rotate on the suspension upright 4 with minimal friction. Finally the suspension system A at each side of the vehicle, has a spring 8 or torsion bar which is extended between the control arm 2 and the structural component B to support the vehicle on the wheel C toward which the control arm 2 extends.

The stabilizer bar D includes left and right sections 16 and 18 and a coupling 20 located between the sections 16 and 18. Each section 16 and 18, in turn, includes a torsion rod 22 and a torque arm 24. The torsion rods 22 extend transversely on the vehicle and lie along a common transverse axis X. Each is encircled by a guide bushing 26 over which a clamping bracket 28 fits. The brackets 28 are, in turn, attached firmly to the structural component B to thus secure the stabilizer bar D to the component B. Even so, the torsion rods 22 can rotate within their respective guide bushings 26. The torque arms 24 extend from the outboard ends of the torsion rods 22 at a substantial angle with respect to the axis X and lie generally longitudinally in the vehicle. At their ends remote from the torsion rods 22 they are connected to the control arms 2 through vertical links 30—the torque arm 24 of the left section 16 being connected to the left control arm 2 through one link 30 and the torque arm 24 of the right section 16 being connected to the right control arm 2 through another link 30.

Figure 3:
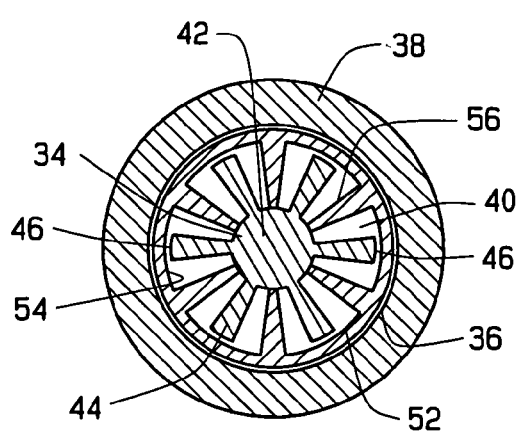
FIG. 3 is a sectional view taken along line 3—3 of FIG. 2.

The coupling 20 controls the torsional stiffness of the stabilizer bar C. It basically includes (FIGS. 2–4) a rotor 34 which is carried by the left section 16, a housing 36 which is carried by the right section 18 and receives the rotor 34, and an electrical coil 38 which surrounds the housing 36. In addition, the coupling 20 includes a magneto-rheological fluid 40 which is contained within the housing 36 and surrounds the rotor 34.

Figure 4:
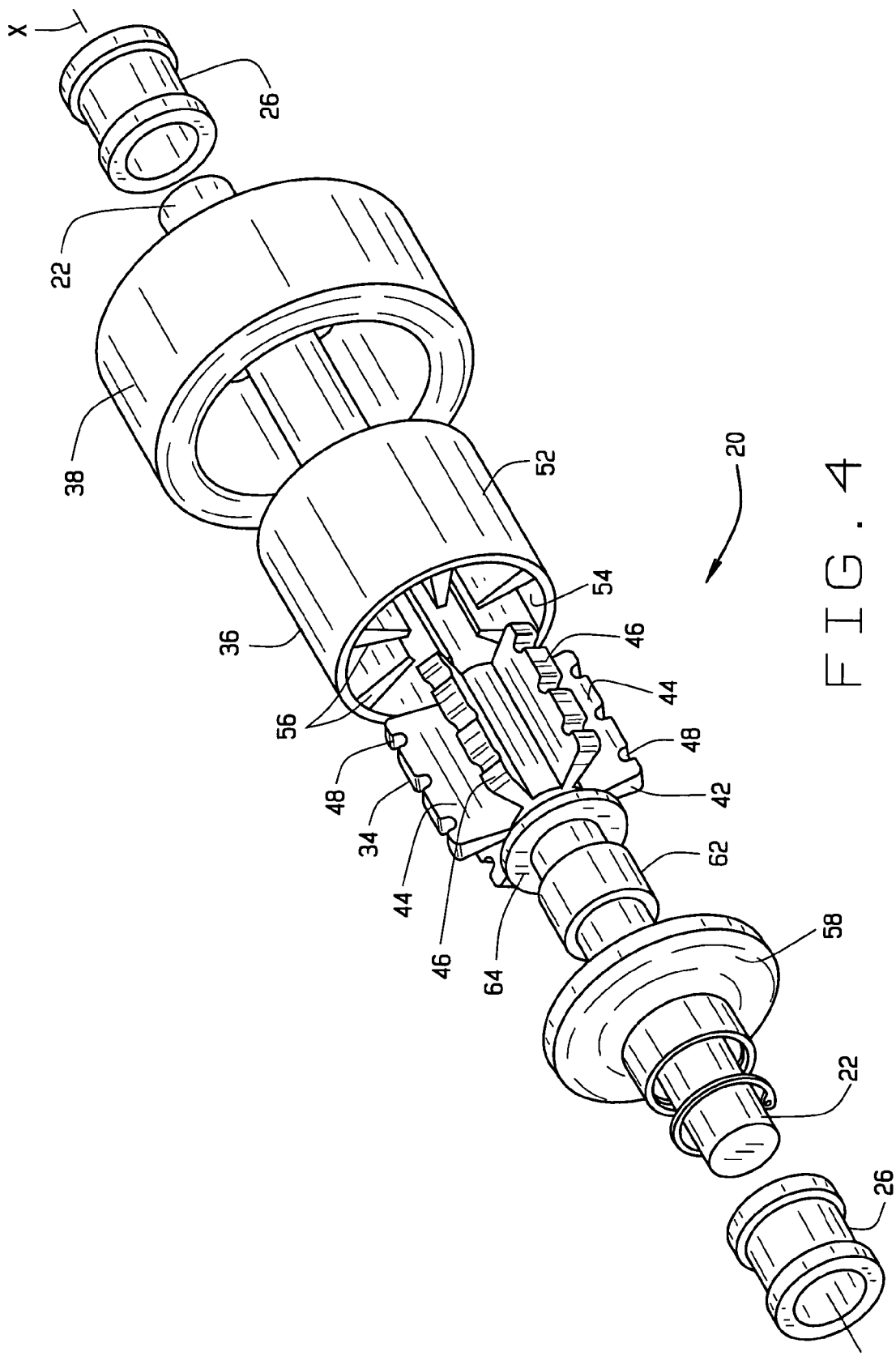
FIG. 4 is an exploded perspective view of the stabilizer bar.

The rotor 34 is attached firmly to the inboard end of the torsion rod 22 for the left section 16. It has a hub 42 and formations in the form of blades or vanes 44 (FIG. 3) which project radially from the hub 42 so that the vanes 44 are oriented radially with respect to the axis X. The vanes 44 have outer edges 46 out of which slots 48 open (FIGS. 2 & 4). The edges 46 form a cylindrical envelope having its center along the axis X.

The housing 36 encloses the rotor 34. To this end, it has an end wall 50 (FIG. 2) that is attached firmly to the inboard end of the torsion rod 22 for the right section 18 and a cylindrical wall 52 (FIG. 4) which extends axially from the end wall 50. The cylindrical wall 52 possesses an interior surface 54 which is cylindrical and has its center at the axis X. Its diameter slightly exceeds the diameter of the cylindrical enveloped formed by the outer edges 46 of the rotor 34. Like the rotor 34, the housing 36 has formations in the form of blades or vanes 56 (FIG. 3), and they project inwardly from the cylindrical wall 52 and at their inner ends contact or lie in close proximity to the surface of the hub 42 on the rotor 34. While the housing vanes 56 occupy the spaces between vanes 44 of the rotor 34, they do not occupy the entirety of those spaces. Thus, a cavity exists within the housing 36 and around the hub 42 of the rotor 34. The number and thickness of the vanes 44 and 56 is such that the coupling 20 can accommodate relative rotation between the left and right sections 16 and 18 of the stabilizer bar C. Normally, the housing vanes 56 are centered between the rotor vanes 44.

In addition, the housing 36 includes an end cap 58 (FIGS. 2 & 4) which fits around the torsion rod 22 of the left section 16 and is secured to the end of the cylindrical wall 54 at a fluid-light joint 60. The end cap 58 contains a sleeve bearing 62 which enables the rotor 34 to rotate relative to the housing 36 while keeping their respective axes aligned along the transverse axis X. The end cap 58 also contains a seal 64 which establishes a dynamic fluid barrier between the rotor 34 and the torsion rod 22 to which it is connected, on the one hand, and the housing 36, on the other. This prevents the rheological fluid 40 from migrating along the torsion rod 22 of the left section 16, so that it remains in the cavity enclosed by the housing 36.

The coil 38 is attached to the housing 36 and encircles the cylindrical wall 54 of the housing 36. When energized, it produces a magnetic field within the interior of the housing 36. The magneto-rheological fluid 40, being within the cavity enclosed by the housing 36, also lies within the magnetic field produced by the coil 38.

The fluid 40 occupies the entirety of the cavity. No air or gas pockets to speak of exist within the cavity or the fluid 40 in it. The viscosity of the fluid 40 depends on the strength of the magnetic field in which the fluid 40 lies, and that strength depends of the magnitude of the current passing through the coil 38. By varying the magnetic field produced by the coil 38, one can vary the viscosity of the fluid 40 from roughly equivalent to that of water to almost a solid—the stronger the field, the greater the viscosity.

When the field is weak or nonexistent, the fluid flows freely and will pass easily between the edges 44 of the rotor vanes 42 and the cylindrical interior surface 54 of the cylindrical wall 52 for the housing 36. It also flows freely through the slots 48. As a consequence, the rotor 34 will rotate in the housing 36 with little impedance from the fluid 40. This condition is ideal for driving straight at any speed over paved roads or for driving at slow speeds over unpaved secondary roads and rough terrain.

However, when the coil 38 conducts current, the fluid becomes more viscous and flows less freely over the edges 44 of the vanes 42 and through the slots 46. As a consequence, the fluid 40 offers resistance to rotation of the rotor 34 within the housing 36—and the amount of resistance depends on the magnitude of the current in the coil 38 and the strength of the field that it produces. The resistance to rotation stiffens the stabilizer bar D. Some resistance is desired when the vehicle negotiates turns on paved road surfaces, with more resistance being desired when negotiating turns at high vehicle speeds, this to exert forces on the structural member B that prevent excessive roll of the vehicle body.

The amount of current supplied to the coil 38 may be controlled manually such as by a rheostat. Preferably, it is controlled by an automatic system which includes sensors that detect the speed of the vehicle, vertical acceleration to detect the condition of the surface over which the vehicle travels, and lateral acceleration to determine the intensity of turns negotiated.

A modified stabilizer bar E (FIG. 5) has a torsion rod 70 which extends uninterrupted between the two torque arms 24 just as in a conventional torsion rod. And while it may be perceived as two torsion rods 22 joined together, it passes through a torque coupling 72 which is very similar to the coupling 20, except that the hub 42 of the rotor 34 is hollow, and both the rotor 34 and housing 36 have tubular extensions 74 extended away from cavity containing the rheological fluid 40. The extensions 74 are clamped or otherwise attached securely to the torsion rod 70 remote from the rotor 34 and housing 36. Thus, the torsion rod 70 extends through both the rotor 34 and the housing 36 of the coupling 72 and between the remote ends of the two tubular extensions 74 so the torsion rod 70 may twist in the coupling 72 and extensions 74.

When it does, relative rotation occurs between the rotor 34 and the housing 36. If the coil 38 is energized, it will increase the viscosity of the fluid 40 in the coupling 72 and the fluid 40 will resist or impede that relative rotation, thereby stiffening the torsion rod 70. Thus, the coupling 72 controls the torsional stiffness of the rod 72 and the stabilizer bar E of which it is a part.

Either stabilizer bar D or E may be extended between the control arms of the rear suspension of an automotive vehicle on even connected to the left and right components of a rear suspension that does not have control arms. Also, the vanes 56 of the housing 36 may be provided with slots 48 in lieu of the vanes 44 of the rotor 34 or both may have slots 48. Different configurations, such as apertures, may be used in lieu of the slots 48. Other Theological fluids, such as those which respond to electrical currents passing through them, may be used in the cavity enclosed by the housing 36 in lieu of the magneto-rheological fluid 40, in which event the coil 38 may not be necessary.

Figure 6:
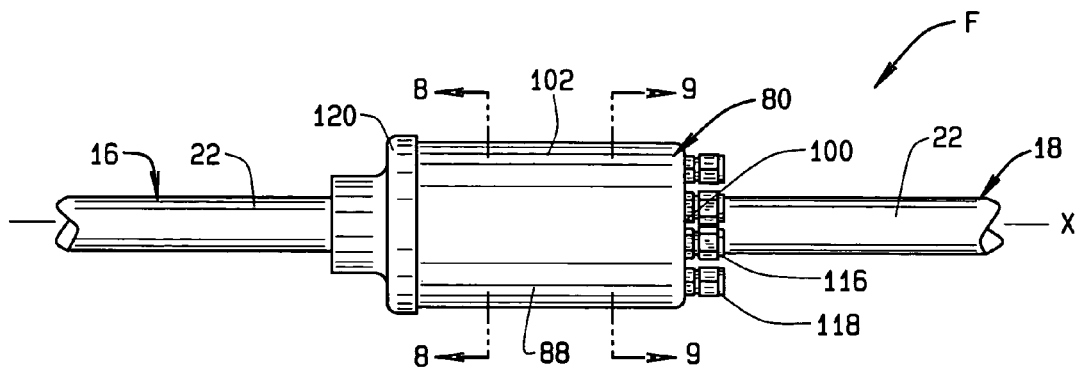
FIG. 6 is a fragmentary view of another modified stabilizer bar showing the coupling of that bar in longitudinal elevation.
Figure 7:
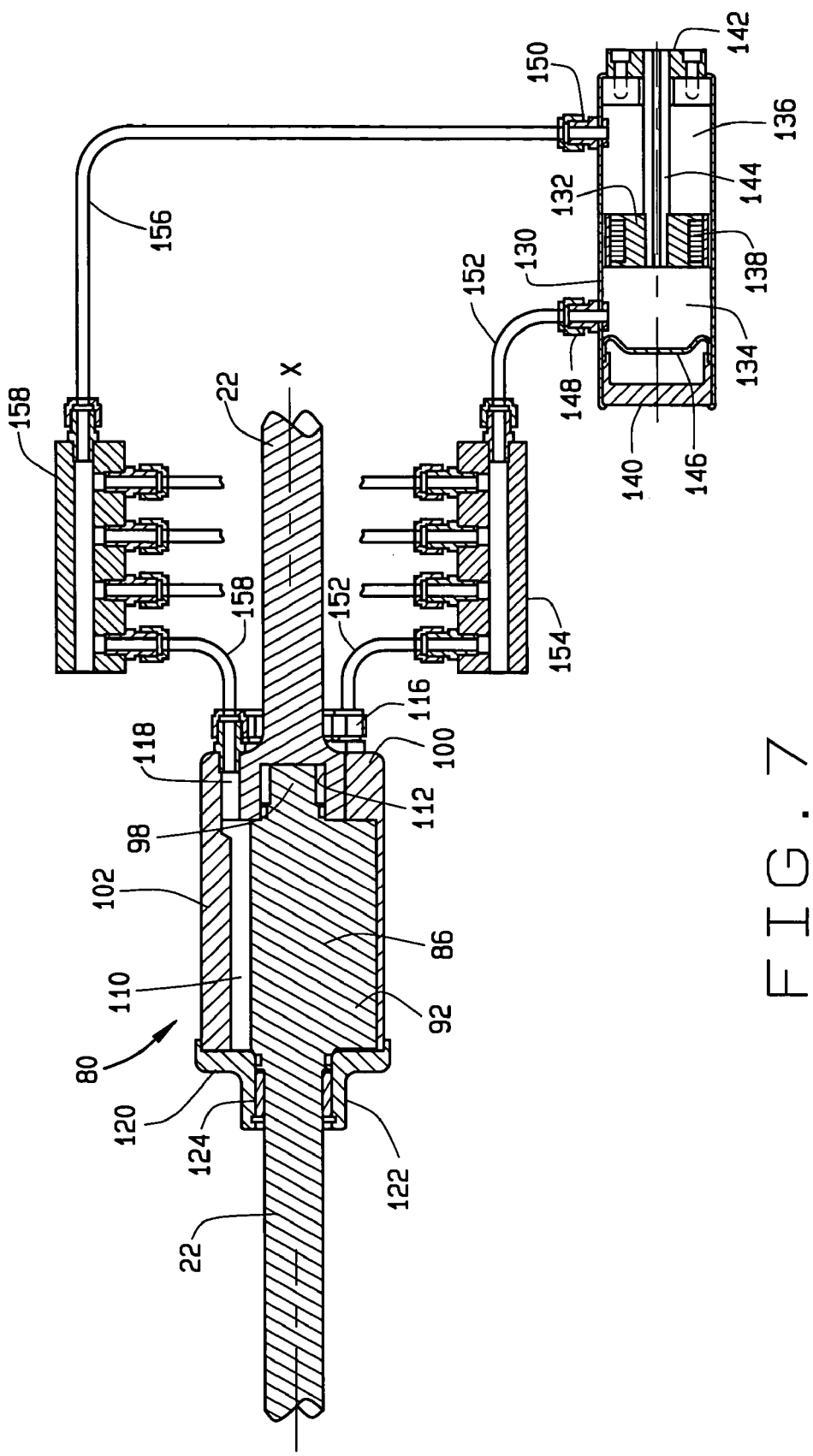
FIG. 7 is a sectional view of the coupling for the modified bar of FIG. 8 together with a valve and manifolds.
Figure 6:
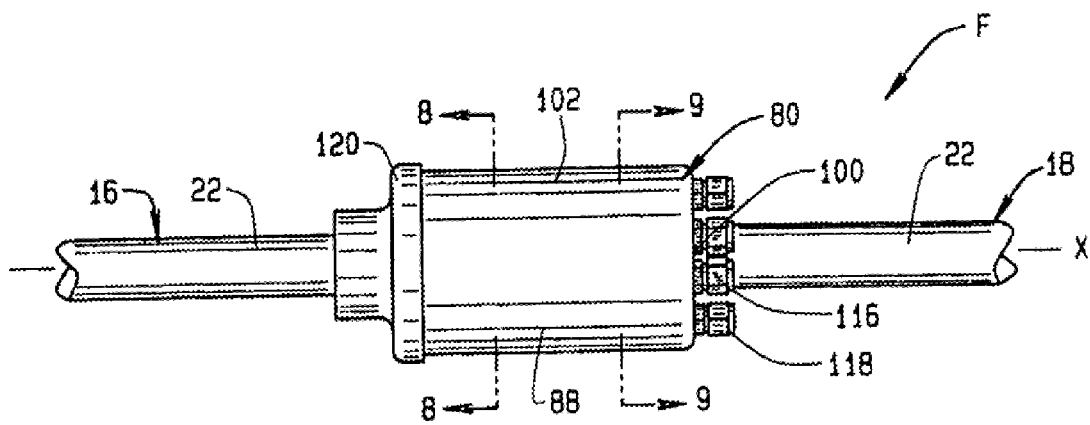
Figure 8:
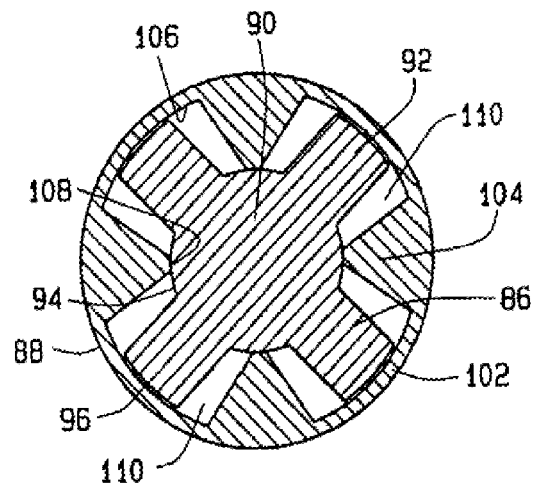
Figure 9:
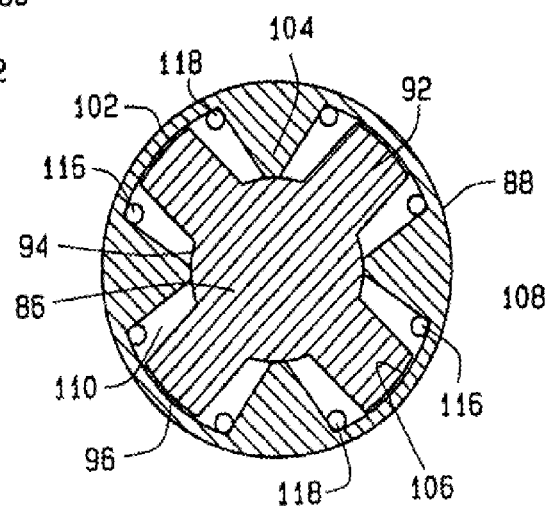
Figure 7:
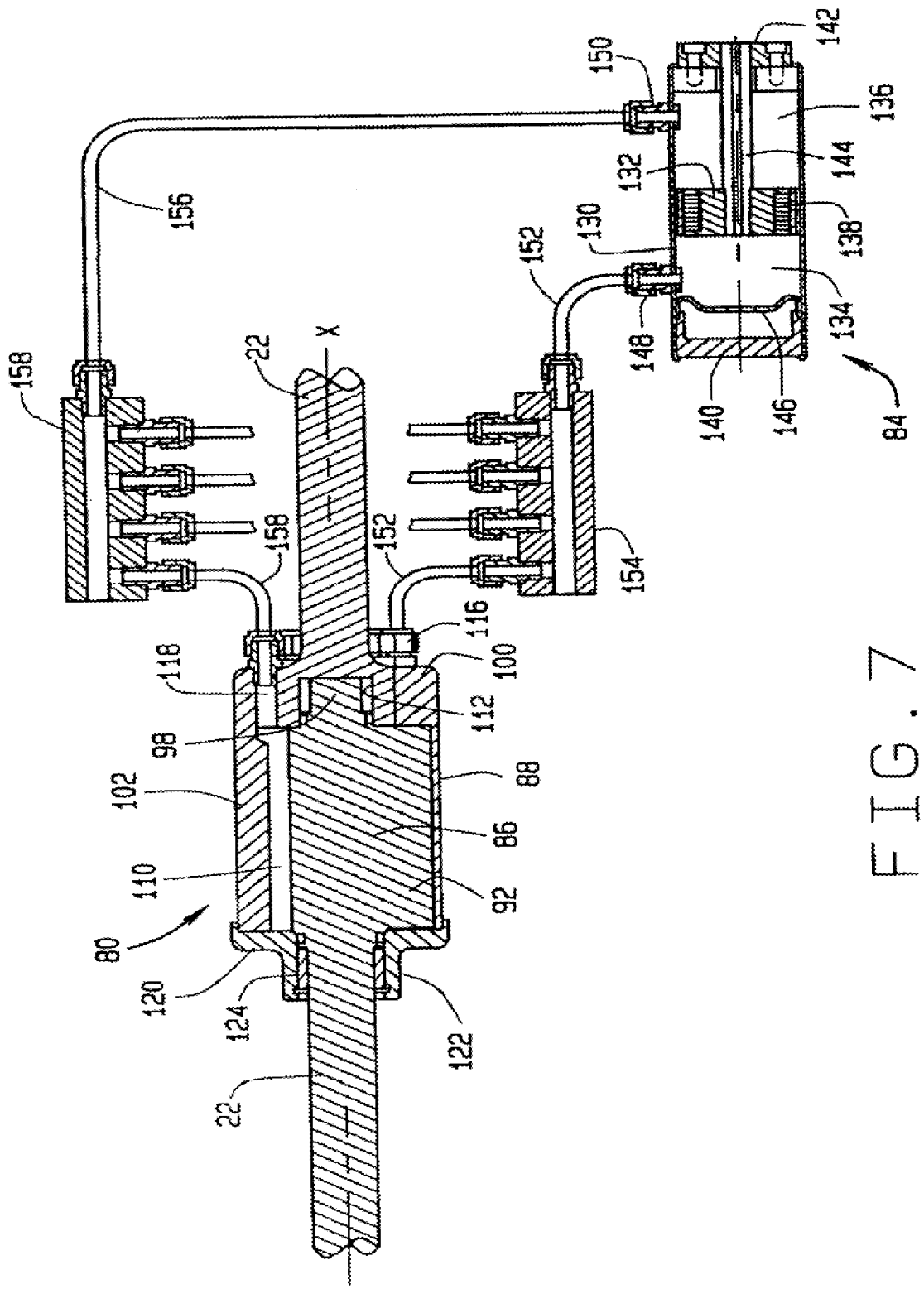

The viscosity of the magneto-rheological fluid need not be controlled at the coupling between the two torsion rods 22 of the sections 16 and 18, but instead may be controlled at a remote location. Another modified stabilizer bar F (FIG. 6) includes a coupling 80 which is located between the torsion rods 22 of its left and right sections 16 and 18. The coupling 80 contains a magneto-rheological fluid 82, but the viscosity of the fluid 82 within the coupling 80 remains essentially the same, notwithstanding variations in the stiffness imparted by the coupling 80 to the stabilizer bar F. Instead, the viscosity is controlled at a valve 84 (FIG. 7) that is located near the suspension system A, but not in the coupling 80 itself.

Figure 8:
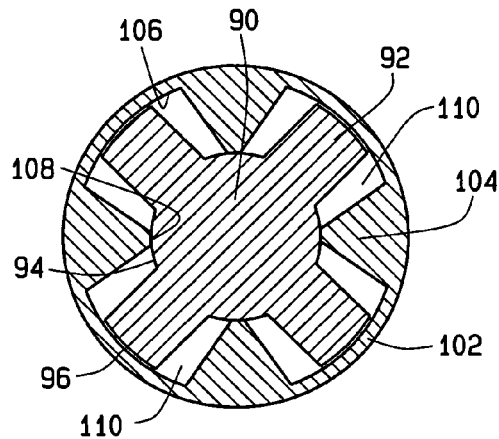
FIG. 8 is a sectional view taken along line 8—8 of FIG. 6.

Considering the coupling 80 first, it includes (FIG. 7) a rotor 86 which is attached to the left section 16 and a housing 88 which is attached to the right section 18 where it surrounds and indeed encloses the rotor 86. The rotor 86 has a hub 90 which is formed integral with or is at least attached securely to the torsion rod 22 of the left section 16. In addition, the rotor 86 has vanes 92 (FIG. 8) which project radially from the hub 90. Between the vanes 82 the hub 90 has arcuate intervening surfaces 94 which lie within a cylindrical envelope having its longitudinal center along the axis X. Finally, the rotor 86 ends at a pilot 98 which projects axially from the hub 90, it too having its axis coincident with the axis X.

The housing 88 has (FIG. 7) an end wall 100, which is formed integral with or is attached securely to the torsion rod 22 of the right section 18, and in addition a cylindrical wall 102 that extends axially from the end wall 100. Apart from that, the housing 88 includes vanes 104 (FIG. 8) which project inwardly from the cylindrical wall 102 at equal circumferential intervals, their number corresponding to that of vanes 92 for the rotor 86. However, the vanes 104 of the housing 88 are narrower than the vanes 92 of the hub 90. Between its vanes 104, the housing 88 has arcuate intervening surfaces 106 which lie within a cylindrical envelope having essentially the same diameter as the cylinder described by the arcuate end surfaces 96 of the rotor vanes 92. At its ends the vanes 104 of the housing 98 have arcuate end surfaces 108 which lie within a cylindrical envelope having essentially the same diameter as the cylindrical described by the arcuate intervening surfaces 94 of the rotor 86. Actually, the arcuate surfaces 106 and 108 on the housing 88 are slightly larger then the arcuate surfaces 96 and 94, respectively, on the rotor 86. Moreover, the veins 92 on the rotor 86, being spaced circumferentially, produce cavities 110 within the housing 88, and the cavities 110 are wider than the vanes 92 of the hub 86.

Hence, the hub 86, when its vanes 92 are aligned with the cavities 110 of the housing 88, will fit into the housing 88. When so disposed, the arcuate end surfaces 96 of the rotor vanes 92 will lie along the arcuate intervening surfaces 106 of the cylindrical wall 102 for the housing 88, and the arcuate end surfaces 108 of the housing vanes 104 will lie along the arcuate intervening surfaces 94 on the hub 90 of the rotor 86. The arrangement is such that fluid barriers are established between the rotor vanes 92 and the housing surfaces 106 and likewise between the housing vanes 104 and the hub surfaces 94. Since the rotor vanes 92 are narrower than the housing cavities 110, the rotor 86 can rotate to and from relative the housing 88 with the maximum displacement of about 20°.

Figure 9:
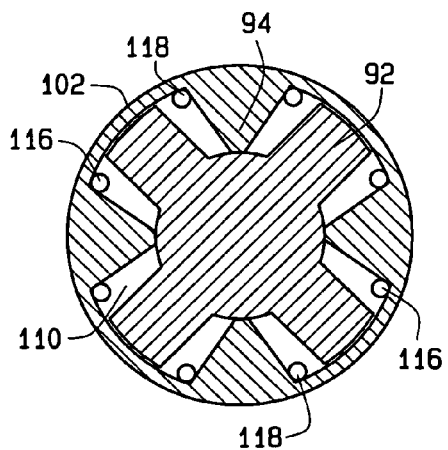
FIG. 9 is a sectional view taken along line 9—9 of FIG. 6.

The end wall 100 contains (FIG. 7) a center bore 112 which opens into the interior of the housing 88 and receives the pilot 98 on the hub 90. The end wall 100 also has (FIG. 9) ports 116 and 118 that open into the cavities 110. Indeed, into each cavity 110 opens both a port 116 at one side of the cavity 110 and a port 118 at the other side of the cavity 110. The ports 116 for the several cavities 110 lie along corresponding sides of cavities 110, that is to say, in one circumferential direction, and the ports 118 likewise lie along the opposite sides in the other circumferential direction.

In addition to its end wall 100 and its cylindrical wall 102, the housing 88 has an end cap 120 which fits against the end of the housing 88 opposite from that to which the end wall 100 is joined. Whereas the end wall 100 closes one end of each cavity 110, the end cap 120, which is initially separate, closes the opposite end of each cavity 110. Moreover, the ends of the vanes 104 lie along the inside faces of end wall 100 and end cap 120, with minimal clearances so as to effect fluid barriers at those locations. The end cap 120 has a sleeve 122 which projects away from the interior of the housing 88 and contains a bearing 124 which surrounds the torsion rod 22 to which the rotor 86 is attached.

The valve 84 includes (FIG. 7) a cylindrical housing 130 and a restrictor 132, which is located within the housing 130 where it divides the interior of the housing 130 into two chambers 134 and 136. In addition, the valve 84 includes an electrical coil 138 that is located within the restrictor 132.

The housing 130 at its ends is closed by end walls 140 and 142, the former of which is fitted with a rod 144 that extends through the interior of the housing 130 to support the restrictor 132 within the housing 130. The other end wall 142 has a flexible diaphragm 146 attached to it such that the diaphragm 146 is presented toward the chamber 134 and such that pressurized gas resides between the diaphragm 146 and the end wall 142. This provides an accumulator at one end of the chamber 134. Finally, the housing 130 has ports 148 and 150, with the former opening into the chamber 134 and the latter into the chamber 136.

The restrictor 132 attaches securely to the end of the rod 144 where it forms a restriction in the housing 88 between the two chambers 134 and 136. To this end, its peripheral surface is set slightly inwardly from the surrounding surface of the housing 130, so that a clearance or controlled gap inches exists between the two surfaces. This clearance allows the magneto-rheological fluid 82 to flow between the two chambers 134 and 134, with the rate of flow being dependent to a large measure on the viscosity of the fluid.

The electrical coil 138 controls the viscosity of the fluid 82. Normally the fluid 82 flows quite freely, but when subjected to a magnetic field, its viscosity increases and indeed varies with the strength of the field—the stronger the field, the greater the viscosity. The coil 138, when conducting an electrical current, produces the magnetic field. Thus, the rate at which the fluid 82 flows between the two chambers 134 and 136 depends on magnitude of the electrical current conducted through the coil 138, and that in turn is dependent on the electrical potential impressed across the coil 138.

The port 148 of the valve 84 is connected (FIG. 7) to the ports 116 of the coupling 80 through fluid lines 152 and a manifold 154. The port 150 of the valve 84, on the other hand, is connected with the ports 118 of the coupling 80 through more fluid lines 156 and another manifold 158. Thus, one side of each cavity 110 in the coupling 80 communicates with the chamber 134 of the valve 84, whereas the other side of each cavity 110 communicates with the chamber 136. Moreover, the magneto-rheological fluid fills the cavities 110, the chambers 134 and 136, the fluid lines 152 and 156, and the manifolds 154 and 158.

Should the torsion rod 22 that is connected to the left section 16 undergo a rotation clockwise relative to the torsion rod 22 of the right section (reference being to FIG. 9), the shapes of the cavities 110 will change, with the sides toward the ports 116 increasing in volume. The ease with which the fluid flows out of the ports 118 and into the chamber 136 of the valve 84, and likewise the ease with the enlarging sides of the cavities 110 are supplied with fluid from the other chamber 134 through the ports 116, depends on the ease with the fluid 82 in the valve 84 can flow from the valve chamber 136 to the valve chamber 134. That, in turn, depends on the viscosity of the fluid 82 in the chambers 134 and 136 which is controlled by the current passing through the electrical coil 138. The opposite sequence occurs when the torsion rod 22 of the left section 16 rotates counterclockwise relative to the torsion rod 22 of the right section 18 (reference being to FIG. 9).

Thus, the stiffness of the stabilizer bar F is under control of the valve 84, specifically, the magnitude of the current passing through the electrical coil 138 of the valve 84.

Variations of the stabilizer bar F are possible. For example, the restrictor 132, rather than directing the fluid through a gap located around its periphery, may direct fluid through apertures that extended through it, or through both a gap around its periphery and through apertures within it. Also, by use of diaphragms, floating pistons, or other separation devices, between the coupling 80 and the valve 84, the operative fluid 82 may consist of a non-rheological fluid in the coupling 80 and a rheological fluid in the valve 84.

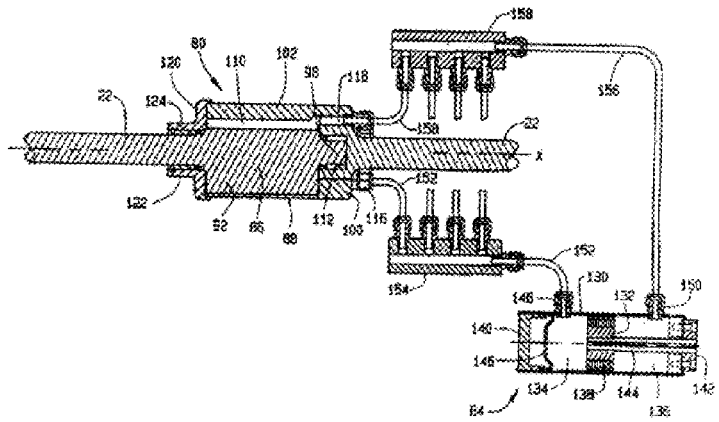

What is claimed is:

1. In combination with a structural component of an automotive vehicle, which further includes left and right control arms pivoted on the vehicle about axes that extend generally longitudinally of the vehicle, and wheel ends that are connected to the control arms remote from the axes about which the control arms pivot, a stabilizer bar for reducing roll of the structural component in turns, said bar comprising:

left and right sections, each having a torsion rod and a torque arm, the torsion rods of the two sections being aligned along an axis that extends transversely of the vehicle and being attached to the structural component such that the sections can rotate relative to the structural component about the axis, the torque arm of the left section extending from the torsion rod of the left section and remote from that torsion rod being attached to the left control arm, the torque arm of the right section extending from the torsion rod of the right section and remote from that torsion rod being attached to the right control arm;

a coupling located between the left and right sections and including a left coupling member attached to the torsion rod of the left section and a right coupling member attached to the torsion rod of the right section, the left and right coupling members forming at least one cavity and having formations which are exposed to the cavity such that the cavity has first and second sides;

a valve located remote from the cavity and having first and second chambers and a restrictor located between the chambers for permitting a restricted flow of fluid between the chamber, the first chamber being in communication with the first side of the cavity in the coupling and the second chamber being in communication with the second side of the cavity;

a coil for producing a magnetic field at the restrictor of the valve;

and a magneto-rheological fluid in the cavity of the coupling and the chambers of the valve.

2. The combination according to claim 1 wherein one of the coupling members is a rotor and the other coupling member is a housing that surrounds the rotor.

3. The combination according to claim 1 wherein the formations on the rotor are vanes which project outwardly away from the transverse axis; and wherein the formations on the housing are vanes which project inwardly toward the axis and into spaces between the vanes of the rotor.

4. A stabilizer bar for a automotive vehicle, said bar comprising:

a first torsion rod;

a second torsion rod aligned with the first torsion rod, a coupling connecting the first and second torsion rods to enable the torsion rods to rotate relative to each other, the coupling defining a cavity and having first and second ports that communicate with the cavity, the coupling having the capacity to discharge a fluid from the first port in response to relative rotation of the rods in one direction and to discharge a fluid from the other port in response to relative rotation of the rods in the other direction;

a valve in communication with the first and second ports for controlling the circulation of the fluid through the valve by varying an electrical current directed through the valve; and a fluid in the cavity and ports of the coupling and in the valve, at least that much of the fluid that is in the valve being rheological, with its viscosity being dependent on the current passing through the valve, whereby the current controls the resistance to relative rotation between the torsion rods.

5. A stabilizer bar according to claim 4 wherein the coupling has a housing that is attached to the first torsion rod and defines the cavity and also has a rotor that is attached to the second torsion rod and is located in the housing, so that the housing and rotor experience relative rotation in response to relative rotation between the first and second torsion rods, the relative rotation between the housing and rotor in one direction causing the rotor to displace the fluid from the cavity into the first port and the relative rotation between the housing and rotor in the opposite direction causing the rotor to displace the fluid from the cavity into the second port.

6. A stabilizer bar according to claim 5 wherein the housing has a plurality of cavities and a plurality of first and second ports communicating with the cavities and also vanes that are directed inwardly and separate the cavities; and wherein the rotor has vanes that project into the cavities and force fluid out of the ports in response to the relative rotation between the housing and rotor.

7. A stabilizer bar according to claim 6 wherein the valve has a first chamber that communicates with the first port of the housing and a second chamber that communicates with the second port of the housing, and also a restriction between the chambers for restricting the flow of fluid between the chambers, with rate of flow being dependent on the viscosity of the fluid at the restrictor.

8. A stabilizer bar according to claim 7 wherein the fluid in the valve is a magneto-rheological fluid, and the valve further includes an electrical coil for producing a magnetic field that controls the viscosity of the fluid at the restrictor.

9. The stabilizer bar according to claim 8 wherein the electrical coil is in the restrictor of the valve.

10. A stabilizer bar according to claim 4 wherein the valve has a first chamber that communicates with the first port of the housing and a second chamber that communicates with the second port of the housing, and also a restriction between the chambers for restricting the flow of fluid between the chambers, with rate of flow being dependent on the viscosity of the fluid at the restrictor.

11. A stabilizer bar according to claim 10 wherein the fluid in the valve is a magneto-rheological fluid, and the valve further includes an electrical coil for producing a magnetic filed that controls the viscosity of the fluid at the restrictor of the valve.

12. A stabilizer bar according to claim 11 wherein the coil is in the restrictor of the valve.

* * * * *

UNITED STATES PATENT AND TRADEMARK OFFICE
CERTIFICATE OF CORRECTION

PATENT NO. : 7,207,574 B2
APPLICATION NO. : 10/739379
DATED : April 24, 2007
INVENTOR(S) : Mircea Gradu It is certified that error appears in the above-identified patent and that said Letters Patent is hereby corrected as shown below:

The Title Page, showing an illustrative figure, should be deleted and substitute therefor the attached Title Page.

Delete drawings sheets 4 of 5 and 5 of 5 and substitute therefor the drawing sheets, consisting of figs. 6-9 as shown on the attached page.

Signed and Sealed this

Twenty-second Day of July, 2008

JON W. DUDAS
*Director of the United States Patent and Trademark Office*

United States Patent
Gradu et al.

(10) Patent No.: US 7,207,574 B2
(45) Date of Patent: Apr. 24, 2007

(54) STABILIZER BAR WITH VARIABLE TORSIONAL STIFFNESS

(75) Inventors: Mircea Gradu, Wooster, OH (US); Timothy L. Schlernitzauer, Canton, OH (US)

(73) Assignee: The Timken Company, Canton, OH (US)

(*) Notice: Subject to any disclaimer, the term of this patent is extended or adjusted under 35 U.S.C. 154(b) by 451 days.

(21) Appl. No.: 10/739,379

(22) Filed: Dec. 18, 2003

(65) Prior Publication Data
US 2004/0217569 A1  Nov. 4, 2004

Related U.S. Application Data

(63) Continuation-in-part of application No. 10/646,077, filed on Aug. 22, 2003, now abandoned.

(60) Provisional application No. 60/467,093, filed on May 1, 2003.

(51) Int. Cl.
B60G 17/027 (2006.01)

(52) U.S. Cl. .................. 280/5.511; 267/277

(58) Field of Classification Search .......... 280/5.511, 280/5.509, 5.51, 124.107, 124.137, 124.152, 280/124.166; 188/296, 307; 267/277, 191
See application file for complete search history.

(56) References Cited

U.S. PATENT DOCUMENTS 3,197,233 A * 7/1965 Klaus et al. .............. 280/5.502
5,791,444 A * 8/1998 Schiffler .................. 188/293
5,826,687 A   10/1998 Büngeler et al.
(Continued)

FOREIGN PATENT DOCUMENTS
DE  4443809 A1  4/1996
(Continued)

OTHER PUBLICATIONS

Brochure, DELPHI Energy & Chassis Systems, 2002, "Dynamic Body Control System".
Brochure, SAE International, Aleksander Hac, Mar. 2002, "Influence of Active Chassis Systems on Vehicle Propensity to Maneuver-Induced Rollovers".

Primary Examiner—David R. Dunn
(74) Attorney, Agent, or Firm—Polster, Lieder, Woodruff & Lucchesi, L.C.

(57) ABSTRACT

A stabilizer bar for controlling the roll of an automotive vehicle has left and right sections, each provided with a torsion rod and a torque arm. The torsion rods are aligned along a transverse axis and attached to a structural component of the vehicle, while the torque arms are connected to the left and right control arms of the vehicle's suspension system. In addition, the bar has a coupling between the torsion rods of the two sections for controlling the torsional stiffness of the bar. The coupling includes a rotor fitted to one of the torsion rods and a housing fitted to the other torsion rod, with the housing receiving the rotor, such that cavities exist between the rotor and housing. Both the rotor and housing carry vanes, that alternate so that the vanes of the rotor are located between the vanes of the housing. The cavities contain a magneto-rheological fluid. The bar also includes an electrical coil controls the viscosity of the fluid either at the coupling or at a valve located remote from the coupling, but in either place, such that the variations in the viscosity of the fluid control the torsional stiffness of the stabilizer bar.

12 Claims, 5 Drawing Sheets